US012578055B2

(12) United States Patent
Díaz Lankenau et al.

(10) Patent No.: US 12,578,055 B2
(45) Date of Patent: Mar. 17, 2026

(54) FRAME ASSEMBLY FOR A THREE-DIMENSIONAL VIDEO COMMUNICATION SYSTEM

(71) Applicant: Google LLC, Mountain View, CA (US)

(72) Inventors: Guillermo Fabian Díaz Lankenau, Santa Cruz, CA (US); Antonio Yamil Layon Halun, Mountain View, CA (US); Kevin Stuart Tong, Santa Clara, CA (US); Kevin John Zulonas, Mill Bay (CA); Andrew Block, San Francisco, CA (US); Andrew Huibers, Los Altos, CA (US); John D. Perreault, Mountain View, CA (US); Punit Narendra Govenji, Pleasanton, CA (US)

(73) Assignee: Google LLC, Mountain View, CA (US)

( * ) Notice: Subject to any disclaimer, the term of this patent is extended or adjusted under 35 U.S.C. 154(b) by 274 days.

(21) Appl. No.: 18/353,642

(22) Filed: Jul. 17, 2023

(65) Prior Publication Data

US 2025/0027600 A1    Jan. 23, 2025

(51) Int. Cl.
F16M 13/02          (2006.01)
F16M 11/10          (2006.01)

(52) U.S. Cl.
CPC ............ *F16M 13/02* (2013.01); *F16M 11/10* (2013.01)

(58) Field of Classification Search
CPC .............................. F16M 13/02; F16M 11/10
See application file for complete search history.

(56) References Cited

U.S. PATENT DOCUMENTS

| | | | |
|---|---|---|---|
| 2015/0362826 A1 | 12/2015 | Araki et al. | |
| 2016/0349599 A1 | 12/2016 | Macmillan et al. | |
| 2017/0045814 A1 | 2/2017 | Geerds | |
| 2017/0152990 A1* | 6/2017 | Kielland | F16M 13/04 |
| 2022/0299159 A1* | 9/2022 | Leblanc | G03B 17/561 |

FOREIGN PATENT DOCUMENTS

CN          214405489 U      10/2021

* cited by examiner

*Primary Examiner* — Nasim N Nirjhar
(74) *Attorney, Agent, or Firm* — Brake Hughes Bellermann LLP

(57) ABSTRACT

A frame assembly for a three-dimensional (3D) communication system provides for mounting of a plurality of image sensors adjacent to, and physically separate from, peripheral boundaries of a display device of the 3D communication system, while also providing for mounting of the display device to an external support structure. The frame assembly includes a support frame that provides for mounting of the plurality of image sensors at the periphery of the display device, and a mounting structure that provides for mounting of the display device, using shared mounting points that do not rely on a mechanical coupling between the display device and the support frame. In this manner, the frame assembly can maintain a relative position of the plurality of image sensors, even in the event of physical changes in configuration of the display device.

19 Claims, 11 Drawing Sheets

FRAME ASSEMBLY FOR A THREE-DIMENSIONAL VIDEO COMMUNICATION SYSTEM

FIELD

This relates, in general, to a frame for a three-dimensional (3D) communication system, and in particular, to a frame that provides for mounting of a plurality of image sensors adjacent to and physically separate from a display device of the 3D communication system.

SUMMARY

In a general aspect, a stereoscopic display system includes a display device, including a backplate including a plurality of light generating components; a plurality of optical layers; and an output layer. The stereoscopic display system includes a frame assembly coupled to the backplate; and a plurality of image sensors mounted on the frame assembly, arranged along outer peripheral portions of an outer boundary of the display device. The frame assembly includes a support frame including at least one mounting member to which the plurality of image sensors are mounted; a mounting portion coupled to the backplate, with the support frame positioned between the mounting portion and the backplate. The mounting portion is configured to provide for mounting of the display device to an external support structure. A plurality of fasteners mount the support frame and the mounting portion of the frame assembly on the backplate at a plurality of common mounting points so as to maintain a relative position of the plurality of image sensors in response to deformation of the backplate.

In some implementations, the support frame includes at least one first support member extending from a first lateral side portion of the display device to a second lateral side portion of the display device; and at least one second support member extending from a central portion of the at least one first support member to an upper side portion of the display device, wherein the at least one mounting member is provided at at least one of an end portion of the at least one first support member corresponding to the first lateral side portion or the second lateral side portion of the display device, or an end portion of the at least one second support member corresponding to the upper side portion of the display device, wherein the plurality of image sensors are arranged on the at least one mounting member.

In some implementations, the mounting portion includes a mounting plate positioned on the support frame, with the support frame positioned between the mounting plate and the backplate; and a mounting bracket positioned on the mounting plate and configured to provide for mounting of the display device to the external support structure, wherein the plurality of fasteners extend through the mounting bracket, through the mounting plate, and into the plurality of common mounting points, such that the mounting portion is directly coupled to the backplate of the display device, and the plurality of fasteners do not extend through the support frame, such that a load generated due to deformation of a backplate of the display device is not transmitted to the support frame.

In some implementations, the support frame includes a compliant frame portion coupled to the backplate of the display device; and a rigid frame portion coupled to the compliant frame portion, wherein the rigid frame portion includes the at least one mounting member on which the plurality of image sensors are arranged.

In some implementations, the compliant frame portion of the support frame includes a compliant support plate at a central portion of the support frame; a plurality of openings formed in the compliant support plate, at positions corresponding to the plurality of common mounting points; and a plurality of compliant support arms extending between the compliant support plate and the rigid frame portion of the support frame.

In some implementations, the rigid frame portion of the support frame includes a rigid member positioned around the compliant support plate, and connected to the compliant support plate by the plurality of compliant support arms; a channel formed in the rigid member defining a cross-sectional contour of the rigid member; and a plurality of support assemblies formed at an outer peripheral portion of the rigid member, including the at least one mounting member to which the plurality of image sensors is mounted.

In some implementations, the mounting portion includes a mounting bracket positioned on the compliant frame portion of the support frame and configured to provide for mounting of the display device to the external support structure, wherein the plurality of fasteners extend through the mounting bracket, through the plurality of openings in the compliant frame portion, and into the plurality of common mounting points.

In some implementations, a rigidity of the rigid frame portion is greater than a rigidity of the compliant frame portion of the support frame, such that a load generated in response to deformation of the backplate of the display device is absorbed by the compliant frame portion and is not transmitted to the rigid frame portion.

In another general aspect, a frame assembly for a stereoscopic display device includes a support frame including a plurality of support members, the support frame including at least one first support member extending from a first end portion to a second end portion of the frame assembly; at least one second support member extending from the at least one first support member to a third end portion of the frame assembly; and at least one third support member, provided at at least one of an end portion of the at least one first support member corresponding to one of the first end portion or the second end portion of the frame assembly, or an end portion of the at least one second support member corresponding to the third end portion of the frame assembly; a mounting plate positioned on the support frame, with the support frame positioned between the mounting plate and the display device; a mounting bracket positioned on the mounting plate and configured to provide for mounting of the display device to an external support structure; and a plurality of fasteners extending through the mounting bracket, through the mounting plate, and into a corresponding plurality of mounting points formed in the display device, wherein the support frame is configured to maintain a relative position of a plurality of image sensors mounted on the at least one third support member at a corresponding peripheral portion of the display device.

In some implementations, the support frame is configured to maintain the relative position of the plurality of image sensors mounted on the at least one third support member in response to a deformation of a backplate of the display device to which the frame assembly is coupled.

In some implementations, the at least one first support member includes a plurality of first support members extending from a first lateral side portion of the display device, corresponding to first end portions of the plurality of first support members, to a second lateral side portion of the display device, corresponding to second end portions of the plurality of first support members; the at least one second support member includes a plurality of second support members extending from a central portion of the plurality of first support members to an upper side portion of the display device; and the at least one third support member includes a first mounting member at the first end portions of the plurality of first support members, extending along the first lateral side portion of the display device; a second mounting member at the second end portions of the plurality of first support members, extending along the second lateral side portion of the display device; and a third mounting member at end portions of the plurality of second support members, extending along the upper side portion of the display device.

In some implementations, the support frame is configured to maintain a relative position of a plurality of images sensors mounted on the first mounting member, the second mounting member, and the third mounting member.

In some implementations, the plurality of fasteners do not extend through the support frame, such that a load generated due to deformation of a backplate of the display device is not transmitted to the support frame.

In some implementations, the frame assembly includes a plurality of mounting protrusions formed on a backplate of the display device, the plurality of mounting protrusions defining the plurality of mounting points formed in the display device.

In some implementations, the plurality of mounting protrusions each include an opening configured to respectively engage the plurality of fasteners, and wherein a thickness of the plurality of mounting protrusions provides for spacing between the backplate and the mounting plate in which the at least one first support member and the at least one second support member are received.

In another general aspect, a stereoscopic display system includes a display device, including a backplate including a plurality of light generating components; a plurality of optical layers; and an output layer; a frame assembly coupled to the backplate, the frame assembly including a support plate; a first channel formed in a peripheral portion of the support plate, the first channel defining a first mounting portion; a plurality of openings formed in the first channel and configured to receive a plurality of fasteners therethrough for mounting of the frame assembly to an external support structure; and a plurality of support members formed at the peripheral portion of the support plate, extending outward from the first channel; and a plurality of image sensors arranged on at least one of the plurality of support members, along a peripheral portion of the display device, so as to maintain a relative position of the plurality of image sensors in response to deformation of the backplate.

In some implementations, the stereoscopic display system includes a plurality of mounting protrusions extending outward, from the backplate of the display device; and a second mounting portion formed in the support plate, the second mounting portion including a plurality of openings formed in the support plate; and a second channel formed in a peripheral portion of the support plate.

In some implementations, the plurality of openings formed in the support plate are configured to slidably engage corresponding mounting protrusions of the plurality of mounting protrusions formed on the backplate; and the second channel is configured to receive corresponding mounting protrusions of the plurality of mounting protrusions formed on the backplate, to couple the display device to the frame assembly.

In some implementations, the plurality of openings formed in the support plate each include a first opening portion; and a second opening portion having a dimension that is less than a corresponding dimension of the first opening portion such that a corresponding mounting protrusion is received in the first opening portion and slidably engaged in the second opening portion. In some implementations, a contour of the first channel inhibits a load, generated in response to deformation of the backplate of the display device, from being transmitted to the plurality of support members on which the plurality of image sensors are arranged.

DETAILED DESCRIPTION

Figure 1A:
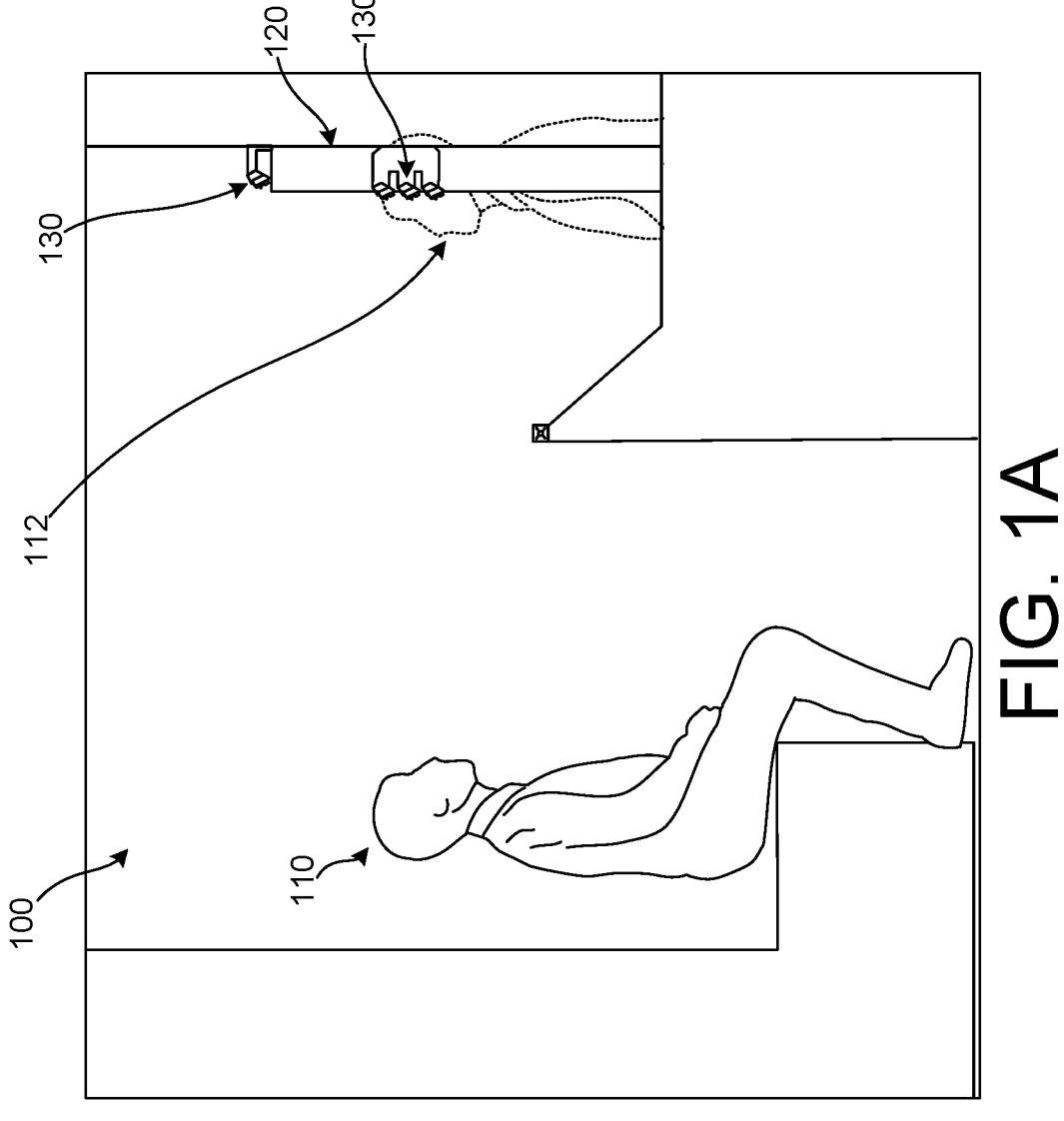
FIG. 1A illustrates an example 3D video communication system.

Three-dimensional (3D) video communication systems can employ stereoscopic display capability to provide for more realistic interaction between users. In one example system, an image of a first user is output to a second user based on a 3D model of the first user. In this type of example system, each user faces a light field display that includes a projection system and an array of image sensors and illumination devices. The light field display projects a 3D, hologram-like, life-size image of the first user, for viewing by the second, remote user. This example arrangement can provide an enhanced, more realistic experience, with the 3D imaging providing live volumetric capture that transmits body language and subtle facial expressions, rather than simply a two-dimensional image. This example arrangement can generate the illusion of the first and second users being together, in the same physical space.

The 3D modeling for output of the 3D image of the users in this example arrangement relies on image data collected by multiple image sensors, with relative positioning of the multiple image sensors remaining constant throughout the collection of the image data, or session. Inconsistency in the relative positioning of the multiple image sensors may adversely impact the ability of the system to produce a high fidelity 3D model/3D image of the user. Mounting of the multiple image sensors to structural components of the system may not always provide the consistently precise relative positioning of the image sensors required to produce the high fidelity 3D model/3D image of the user. That is, operation of heat generating components may cause expansion and/or physical distortion or warping of structural components of the system to which the image sensors would be physically attached. This physical distortion or warping of those structural components can, in turn, alter the relative positioning of the multiple image sensors, thus adversely impacting the collection of image data relied upon for the output of the 3D model/3D image of the user.

These types of 3D light field displays can produce an autostereoscopic effect that enables an observer to perceive image depth, without the need for specialized head mounted devices (augmented reality goggles, glasses and the like). In some examples, this autostereoscopic effect is generated by a 3D light field display including lenticular optics. In some examples, the lenticular optics may include a series of lenses, or image sensors, positioned along a periphery of a display device of the system. In some examples, the display device is a stereoscopic display device. In some examples, the lenticular optics, or image sensors, combine multiple streams of moving image data, or video data, into a composite 3D video/moving image for output by the system. The recording and/or output of 3D video/moving image content requires the lenticular optics, or image sensors, to be positioned with high precision relative to one another for the entirety of the video session to provide for high quality output.

As noted above, variation in the position and/or orientation of any one the image sensors may diminish the image quality of the resulting 3D image output by the system. In some examples, the lenticular optics, or image sensors, may be mounted to a structural component of the display device in an effort to provide the required consistency and precision in the relative positioning of the lenticular optics, or image sensors. However, in some situations, operation of heat generating components of the display device (e.g., light emitting diodes and/or other electronic components) may produce thermally induced expansion, causing expansion and/or distortion, and in particular, non-uniform expansion or distortion, of structural components of the display device, and corresponding shifting in the relatively positioning of the lenticular optics, or image sensors. Such shifting of the relative positioning of the lenticular optics, or image sensors, may in turn affect the ability of the system to effectively collect the 3D video/moving image data relied upon for the output of high quality 3D image content. Consequently, existing commercial display systems lack the precision and the thermally stable geometry needed to sustain performance of the lenticular optics, or image sensors, for high quality 3D video communication, and are thus not viable for hyper-realistic telepresence systems.

A frame for a three-dimensional (3D) communication system, in accordance with implementations described herein, provides for mounting of a plurality of image sensors adjacent to, and physically separate from, a display device of the 3D communication system. In some examples, the display device is a stereoscopic display device. In some examples, the frame supports the plurality of image sensors at boundaries of the display device of the 3D communication system, and provides for mounting of the display device/3D communication system (e.g., to a wall, a stand, and the like), without a load path between the frame and structural components of the display device that would otherwise transfer loads between structural components of the display device and the plurality of image sensors. In some examples, the frame maintains a relative position of the plurality of image sensors, even in the event of physical changes in configuration of the display device, through isolation of portion(s) of the frame to which the plurality of image sensors are mounted from portion(s) of the frame to which structural components of the display device are mounted. Such physical changes in configuration of the display device can include, for example, geometric distortion of the display device in response to heat generated by components of the display that can cause expansion, and in particular, non-uniform expansion, of structural components of the display device.

Figure 1B:
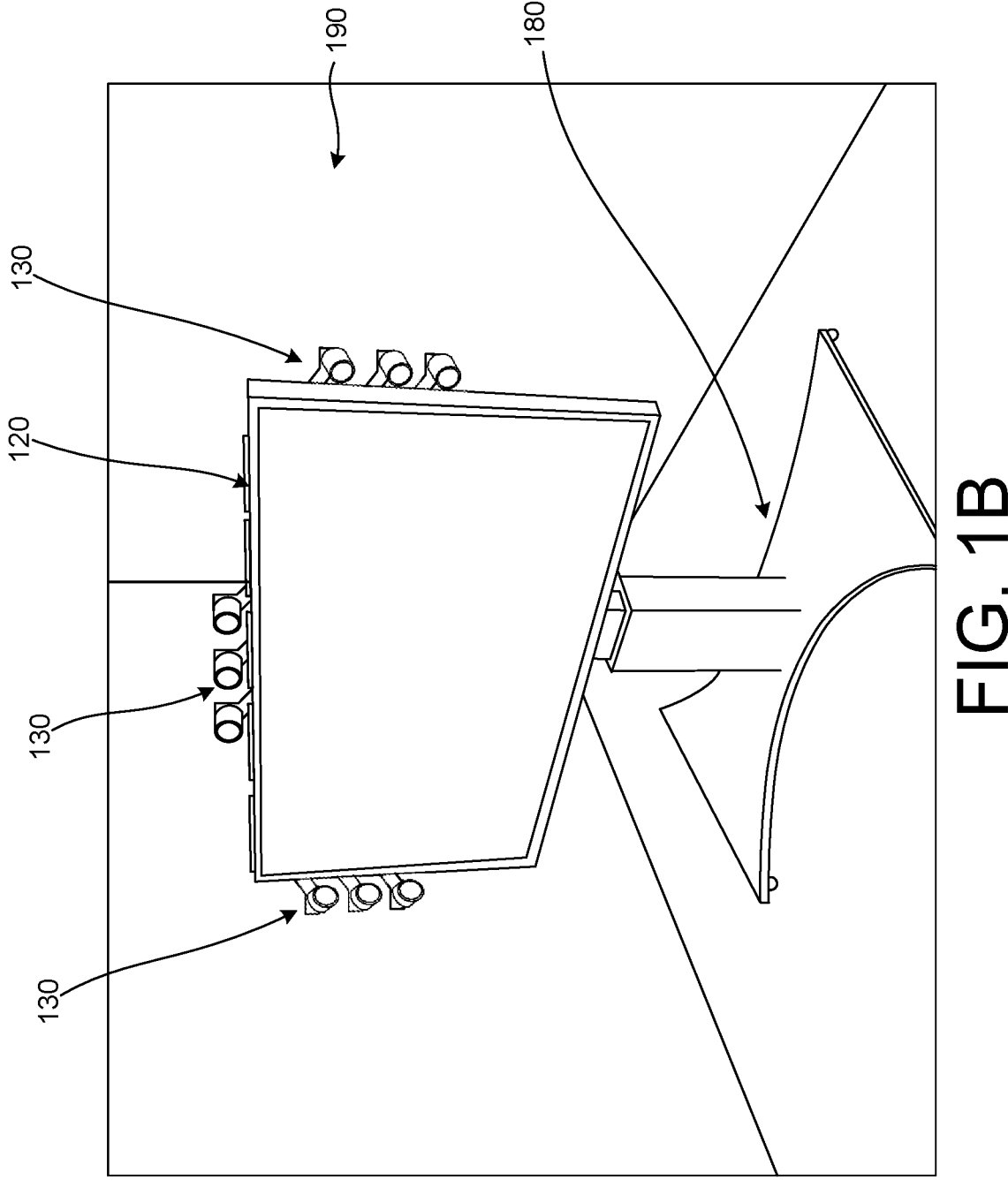
FIG. 1B illustrates an example display device of the example 3D video communication system shown in FIG. 1A.

FIG. 1A illustrates an example 3D video communication system 100 including a display device 120, e.g., an optical display device, or a stereoscopic display device, with a plurality of image sensors 130, or cameras, mounted in a precise arrangement relative to the display device 120. FIG. 1B is a perspective view of the example display device 120 of the example 3D video communication system 100 shown in FIG. 1A. In the example arrangement shown in FIGS. 1A and 1B, the plurality of image sensors 130, or cameras, are mounted on a frame at a periphery of the display device 120. In some examples, the display device 120 can be mounted on a support structure. In the example arrangement shown in FIG. 1B, the display device 120 is mounted on a support structure defined by a stand 180. In some examples, the display device 120 can be mounted on a support structure defined by a wall surface 190. In the example shown in FIG. 1A, a local user 110 is positioned opposite the display device 120, to observe a 3D image 112 of a remote user. In some examples, the local user 110 is positioned at a distance from the display device 120 that would correspond to two people meeting together in the same room. The arrangement(s) of the plurality of image sensors 130, or cameras, are focused simultaneously on the local user 110 to provide the remote user with a similar 3D image of the local user 110.

Figure 1C:
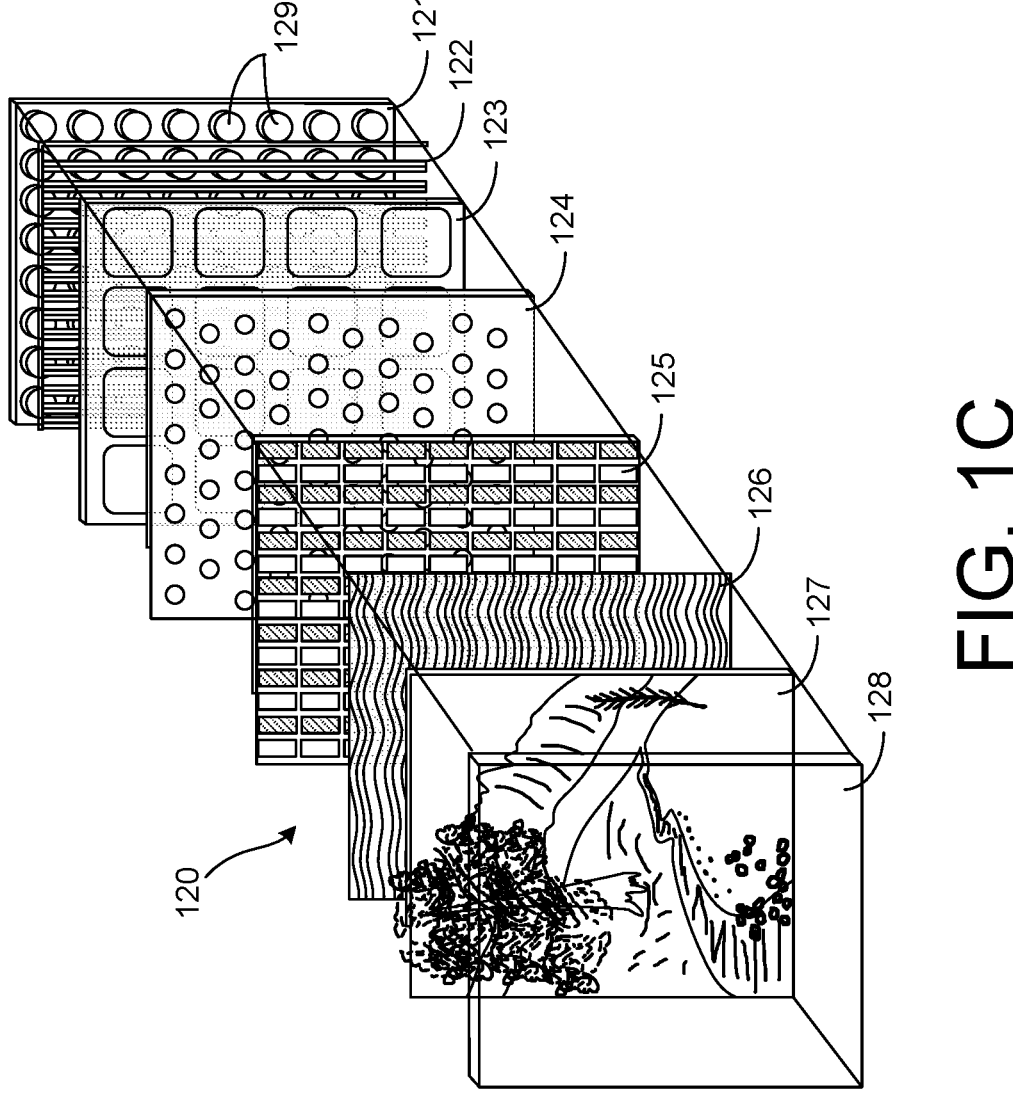
FIG. 1C illustrates example components of the example display device shown in FIG. 1B.

FIG. 1C is an exploded perspective view, illustrating various layers of the example display device 120. In some examples, the display device 120 is a stereoscopic display device incorporated into the 3D video communication system 100 that can produce an autostereoscopic effect that enables a user (for example, the local user 110) to perceive image depth (for example, the 3D image 112 of the remote user). The display device 120 can include, for example, a backplate 121, a first polarizing layer 122, a thin film transistor (TFT) layer 123, a liquid crystal display (LCD) layer 124, a color filter layer 125, a second polarizing layer 126, a picture layer 127, and a cover 128. In the example shown in FIG. 1C, the backplate 121 includes LEDs 129 as light sources for the display device 120. The LEDs 129 can be arranged as a matrix array that occupies a relatively large portion of the display area of the display device 120, so as to form a light field display. The picture layer 127 is where the projected image is formed. The cover 128 can be, for example, a glass layer that protects the picture layer 127. The arrangement of components shown in FIG. 1C is provided for purposes of discussion and illustration. The principles described herein can be applied to a 3D video communication system including a display device having more, or fewer, components than shown, arranged similarly to or differently from the arrangement shown in FIG. 1C.

As noted above, operation of heat generating components of the display device 120, such as, for example, the LEDs 129 provided on the backplate 121, can generate thermally induced distortion, or warping of the backplate 121 and/or other components of the display device 120 that are physically coupled or connected thereto. As also noted above, a challenge in generating high quality 3D moving image/video content is to precisely maintain positions of the plurality of image sensors 130, or cameras, and in particular, relative positioning of the plurality of image sensors 130, or cameras, to provide for combination of the moving image/video feeds from the plurality of image sensors 130, or cameras. If the positions of the plurality of image sensors 130, or cameras, vary with respect to one another, misalignment in the overlays of the video images diminishes the quality of the resulting output video image. Connection, for example, physical connection or coupling, of the plurality of image sensors 130, or cameras, to portions of the display device 120 that are subject to this type of distortion or warping may result in changes in the physical positioning, and relative positioning of the plurality of image sensors 130, or cameras, thus adversely impacting overlay of the moving image/video feeds provided by the plurality of image sensors 130, or cameras, and in the resulting 3D image generated from the moving image/video feeds.

A frame, in accordance with implementations described herein, provides for the mounting of a plurality of image sensors, or cameras, at a periphery of a display device of a 3D video communication system, and for the mounting of the display device to an external support structure. In some examples, the mounting of the plurality of image sensors, or cameras, at the periphery of the display device, is physically isolated from structural components of the display device. A frame, in accordance with implementations described herein, provides for the mounting of the plurality of image sensors, or cameras, such that a relative position of the plurality of image sensors, or cameras, is maintained, even in the event of physical changes in the structural components of the display device.

Figure 2A:
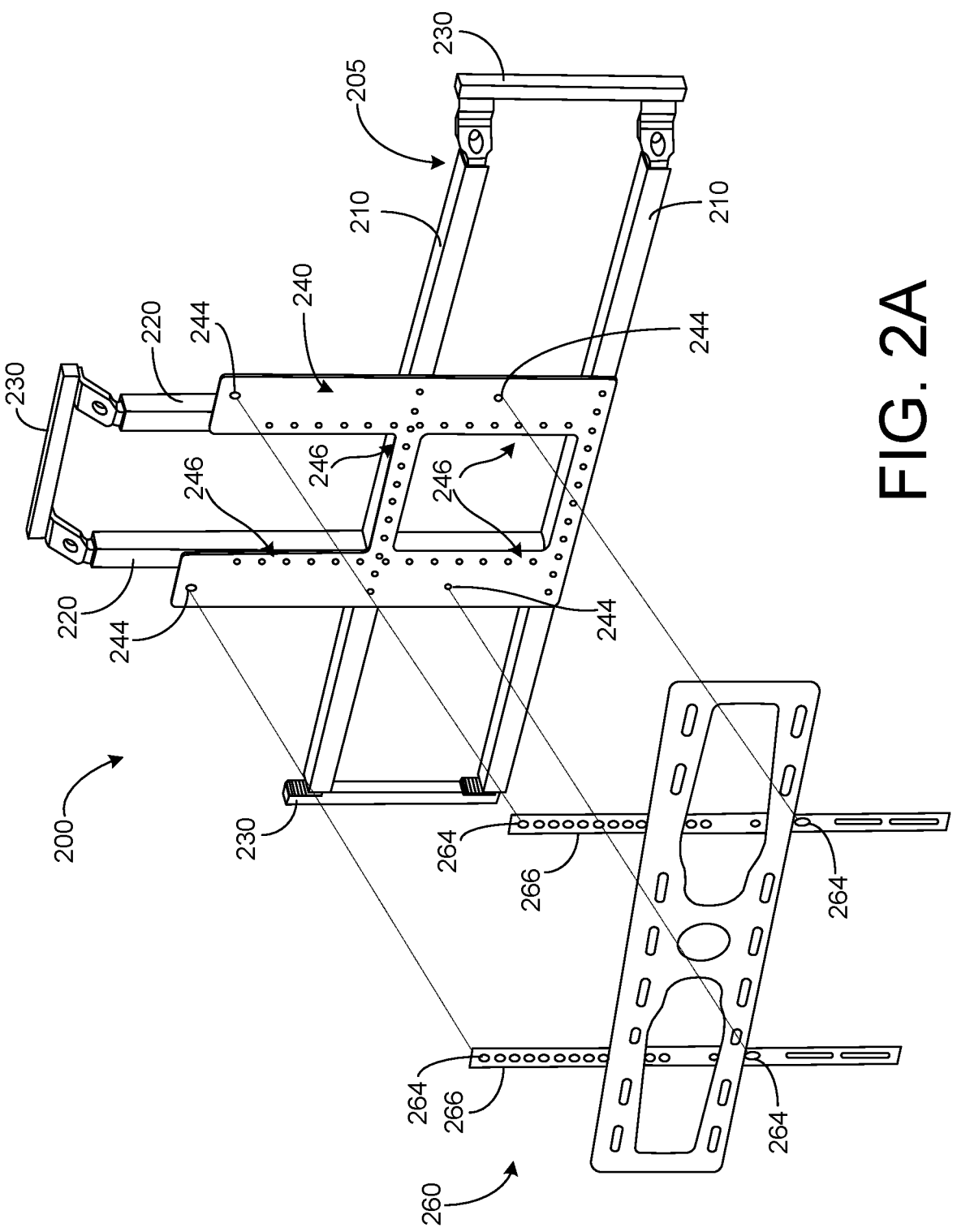
FIG. 2A is a perspective view of an example frame assembly configured for mounting of a plurality of cameras relative to a display device of a 3D video communication system.
Figure 2B:
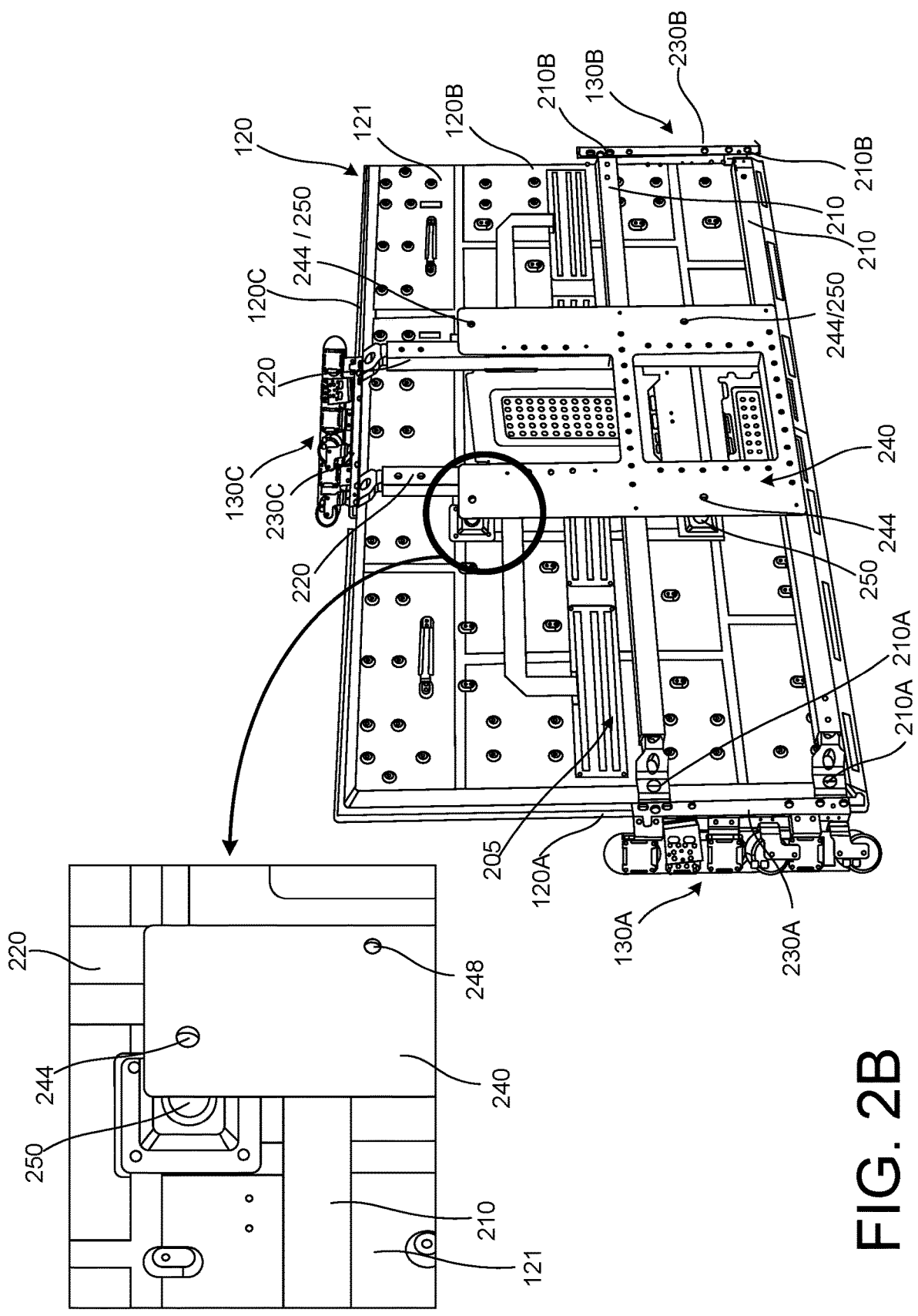
FIG. 2B is a perspective view, illustrating positioning of the example frame assembly shown in FIG. 2A, relative to an example display device.
Figure 2C:
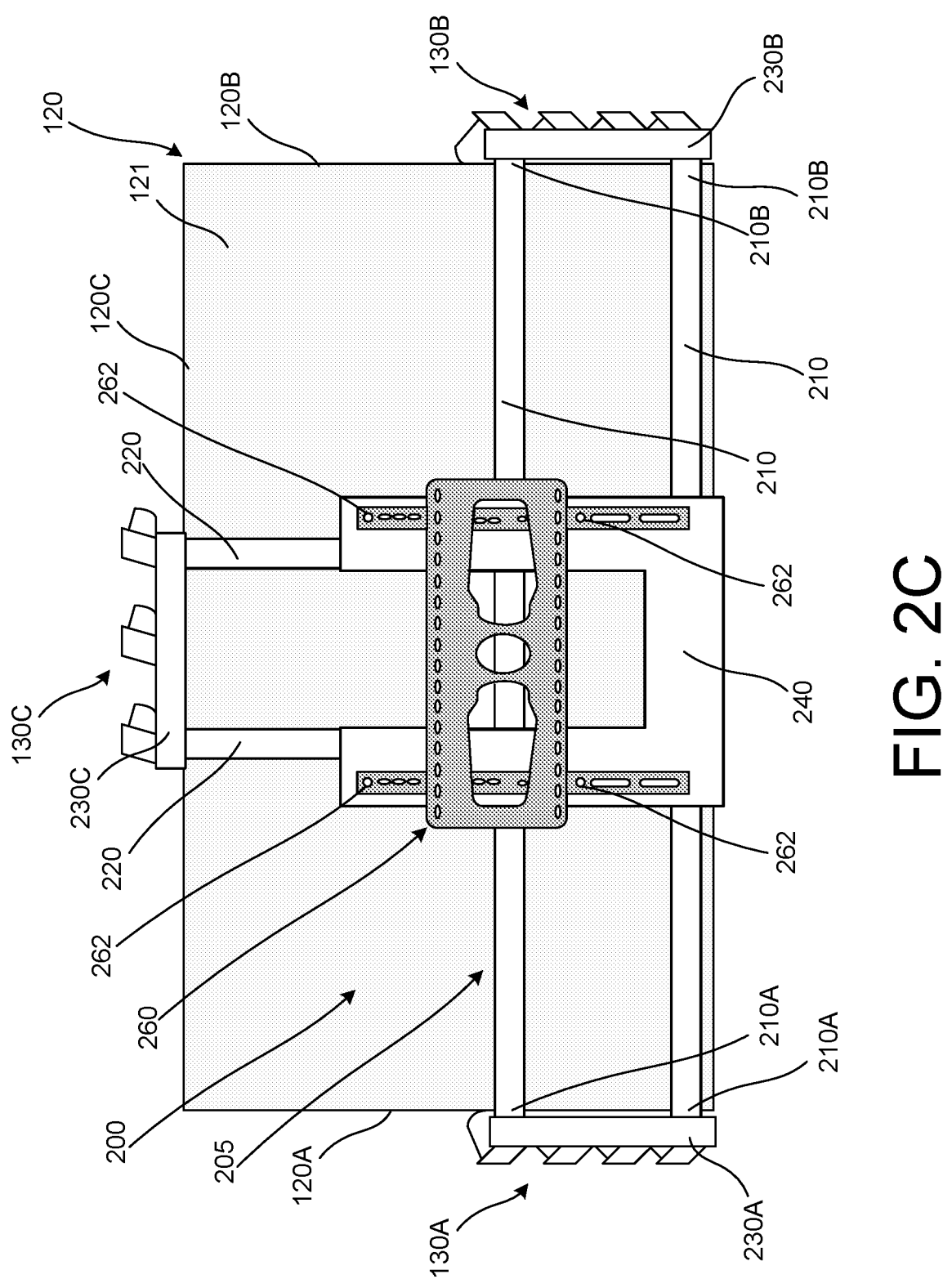
FIG. 2C is a plan view, illustrating positioning of the example frame assembly shown in FIG. 2A, including an example display mount, relative to the example display device.

FIGS. 2A-2C illustrate an example frame assembly 200, in accordance with implementations described herein. In particular, FIG. 2A is a perspective view of the example frame assembly 200. FIG. 2B is a perspective view, illustrating a positioning of an example support frame 205 and an example support plate 240 of the example frame assembly 200 relative to an example display device, such as the example display device 120 described above. FIG. 2C is a plan view, illustrating positioning of components of the example frame assembly 200 including an example mounting bracket 260 relative to the example display device 120. The example frame assembly 200 may provide for the mounting of a plurality of image sensors 130, or cameras at a periphery of the example display device 120, while maintaining a relative position of the plurality of image sensors 130, or cameras, even in the event of deformation and/or warping of structural components of the display device 120. That is, the example frame assembly 200 may be mounted such that there is no load path between the support frame 205 and and structural components of the display device 120, such as, for example the backplate 121, such that deformation of the structural components of the display device 120 is not transferred or transmitted to the support frame 205 of the example frame assembly 200, to which the plurality of image sensors 130, or cameras, are mounted, and relative positioning of the plurality of image sensors 130, or cameras, is not affected by deformation experienced at the backplate 121 due to operation of the heat generating components.

In some examples, the support frame 205 includes a plurality of support members. In the example arrangement shown in FIGS. 2A-2C, the example support frame 205 includes two horizontally oriented first support members 210, and two vertically oriented second support members 220, simply for purposes of discussion and illustration. In the example arrangement shown in FIGS. 2A-2C, the example support frame 205 includes three third support members 230, or mounting members, provided at corresponding end portions of the first support members 210 and the second support members 220, simply for purposes of discussion and illustration. The example frame assembly 200/example support frame 205 can include more, or fewer, support members, oriented similarly to or differently from the support members shown in FIGS. 2A-2C.

In some examples, in an installed configuration of the example frame assembly 200 on the example display device 120, the first support members 210 extend from a first peripheral portion 120A of the display device 120 to a second peripheral portion 120B of the display device 120. In some examples, in the installed configuration, the second support members 220 extend to a third peripheral portion 120C of the display device 120. In some examples, the first peripheral portion 120A of the display device 120 corresponds to a first lateral side portion of the display device 120; the second peripheral portion 120B corresponds to a second lateral side portion of the display device 120; and the third peripheral portion 120C corresponds to an upper side portion of the display device 120.

In the example arrangement shown in FIGS. 2A-2C, the third support members 230, or mounting members, are provided at corresponding end portions of the first support members 210 and at corresponding end portions of the second support members 220. The third support members 230, or mounting members, may be oriented so as to be arranged along corresponding peripheral portions of the example display device 120, to provide for the mounting of components such as, for example, image sensors, or cameras, that capture moving image/video data, for example, of the local user 110 in the example arrangement described above. In some examples, the third support members 230, or mounting members, may provide for the mounting of components such as, for example, illumination devices, optical output/projection devices, audio input devices such as microphones, audio output devices such as speakers, and other such components.

In this example arrangement, one of the third support members 230A is provided at a first end portion 210A of the first support members 210, to provide for the mounting of at least one first image sensor 130A (and/or other components) at the first side portion 120A/first lateral end portion of the display device 120. In this example, another of the third support members 230B is provided at a second end portion 210B of the first support members 210, to provide for mounting of at least one second image sensor 130B (and/or other components) at the second side portion 120B/second lateral end portion of the display device 120. In this example, another of the third support members 230C is provided at end portions of the second support members 220, to provide for mounting of at least one third image sensor 130C (and/or other components) at the third side portion 120C/upper side portion of the display device 120. FIG. 2B provides just one example arrangement of the support frame 205 of the example frame assembly 200 for the mounting of the plurality of image sensors 130, or cameras, relative to the display device 120. The principles described herein can be applied to other numbers and/or arrangements of image sensors 130, or cameras, relative to the display device 120.

In some examples, a mounting plate 240 is positioned at a portion of the example support frame 205 corresponding to a portion of the first support members 210 and a portion of the second support members 220. In the example arrangement shown in FIGS. 2A-2C, the mounting plate 240 is positioned at a substantially central portion of the example support frame 205, simply for purposes of discussion and illustration. In some examples, the mounting plate 240 is coupled to the support frame 205. In some examples, a plurality of fasteners 248 extend through a plurality of openings 246 in the mounting plate 240, and into corresponding openings in the support frame 205 to couple the mounting plate 240 to the support frame 205. In some examples, the plurality of fasteners 248 extend through the openings 246 in the mounting plate 240 and into a corresponding plurality of openings in the first support members 210 and/or the second support members 220 to couple the mounting plate 240 to the support frame 205. In some examples, the fasteners 248 are threaded fasteners such as screws. In some examples, the fasteners 248 are threaded fasteners such as bolts. In some examples, the fasteners 248 are rivets. In some examples, the fasteners 248 are dowels. In some examples, the fasteners 248 include a combination of different types of fastening devices.

As shown in more detail in FIG. 2B, in some examples, at least one mounting protrusion 250 is provided between the backplate 121 of the display device 120 and the mounting plate 240. In some examples, the at least one mounting protrusion 250 is defined by a protrusion provided on the backplate 121 and extending outward from the backplate 121. In some examples, a dimension, for example, a protruded distance, of the at least one mounting protrusion 250 from the backplate 121 of the display device 120, provides for spacing between the backplate 121 and the mounting plate 240. The spacing provided by the at least one mounting protrusion 250 may provide space to accommodate the first support members 210 and the second support members 220 between the backplate 121 and the mounting plate 240. In some examples, the at least one mounting protrusion 250 includes an opening configured to receive a fastener. The fastener received in the opening in the at least one mounting protrusion 250 may provide for the mounting of the mounting bracket 260 and the mounting plate 240 to the backplate 121 of the display device 120.

FIG. 2C illustrates an installed arrangement of the frame assembly 200 on the example display device 120. The mounting bracket 260 provides for the mounting of the display device 120 to an external support structure such as, for example, the stand 180 shown in FIG. 1B, the wall surface 190 shown in FIG. 1B, and the like.

In some examples, the mounting bracket 260 is coupled to the backplate 121 of the display device 120 by, for example, at least one fastener 262. In some examples, the at least one fastener 262 extends through an opening 264 in an arm portion 266 of the mounting bracket 260, through a corresponding opening 244 in the mounting plate 240, and into a corresponding mounting protrusion 250 on the backplate 121 of the display device 120. In the example arrangement shown in FIGS. 2A-2C, the backplate 121 includes four mounting protrusions 250, with four fasteners 262 each extending through a corresponding opening 264 in the arm portion 266 of the mounting bracket 260, through a corresponding opening 244 in the mounting plate 240, and into an opening in the respective mounting protrusion 250, simply for purposes of discussion and illustration. The principles described herein can be applied to mounting arrangements including more, or fewer mounting points, and/or combinations of mounting points. In some examples, the fasteners 262 are threaded fasteners such as screws. In some examples, the fasteners 262 are threaded fasteners such as bolts. In some examples, the fasteners 262 are rivets. In some examples, the fasteners 262 are dowels. In some examples, the fasteners 262 include a combination of different types of fastening devices.

In the example arrangement shown in FIGS. 2B and 2C, the support frame 205 is positioned between the backplate 121 of the display device 120 and the mounting plate 240, and the mounting plate 240 is positioned between the support frame 205 and the mounting bracket 260. In this example, each fastener 262 extends through the opening 264 in the mounting bracket 260, through the opening 244 in the mounting plate 240, and into the opening in the mounting protrusion 250 on the backplate 121 of the display device 120. This couples the display device 120 and the support frame 205 to the mounting bracket 260 at shared, or common mounting points, and provides for the mounting of the display device 120 to an external support structure such as the stand 180, the wall surface 190, and the like. In this arrangement, there is no direct load path between the backplate 121 of the display device 120 and the first support members 210 and/or second support members 220, and/or third support members 230 to which the plurality of image sensors 130, or cameras, are ultimately mounted. The shared, or common mounting points, which extend through the mounting plate 240, provide for mounting of the display device 120 to the desired support structure. However, this mounting arrangement inhibits the transfer of deformation forces from the display device 120 into the first support members 210 and/or second support members 220, and to the third support members 230 to which the plurality of image sensors 130, or cameras, are mounted. Thus, in this example arrangement, even in the event of deformation, or warping, or deflection of the backplate 121 of the display device 120, the plurality of image sensors 130, or cameras, mounted at the third support members 230 of the frame assembly 200 will maintain their relative positions, thus preserving the integrity of the image data obtained by the plurality of image sensors 130, or cameras.

Figure 3A:
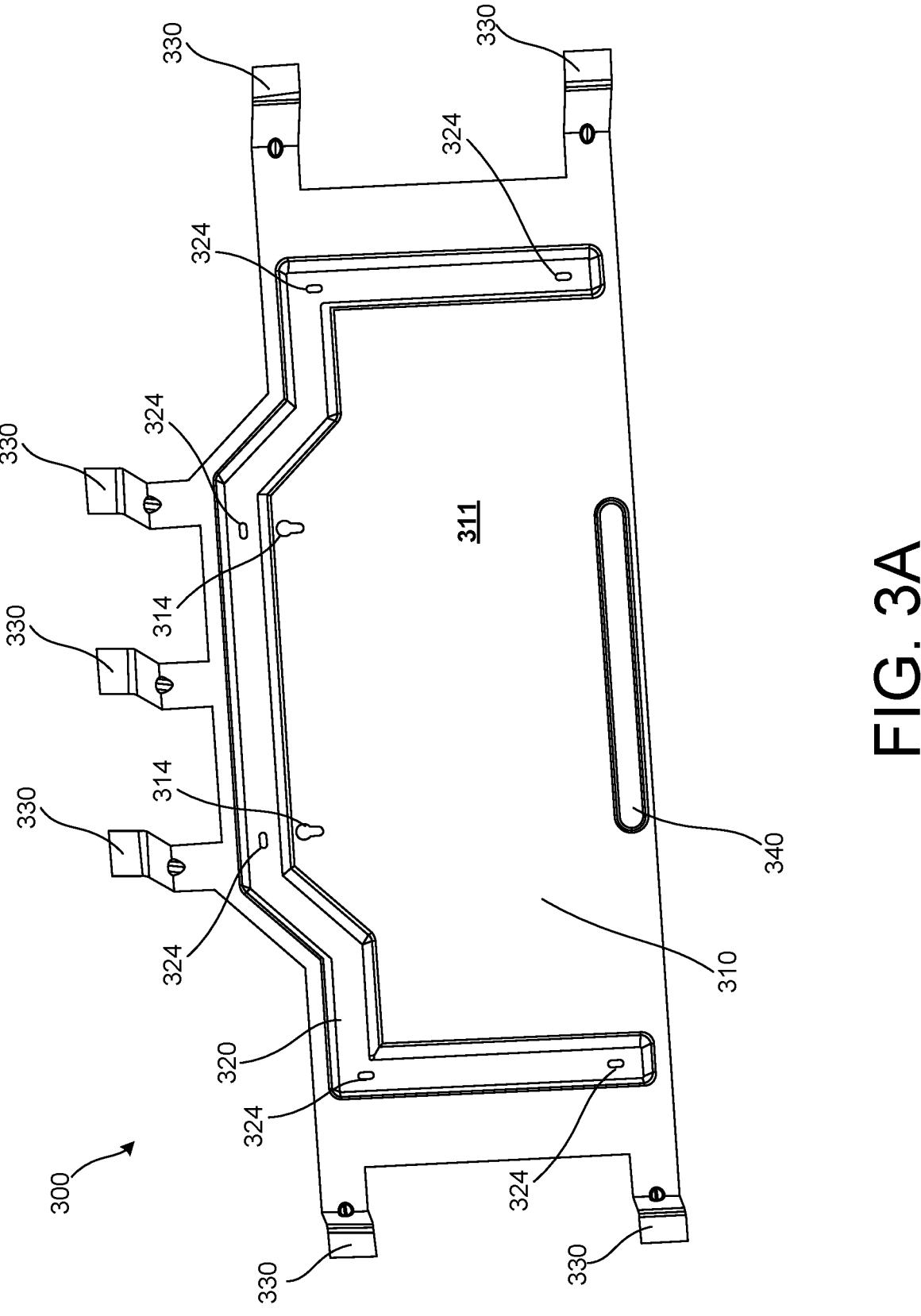
FIG. 3A is a first perspective of an example frame assembly configured for mounting of a plurality of cameras relative to a display device of a 3D video communication system.
Figure 3B:
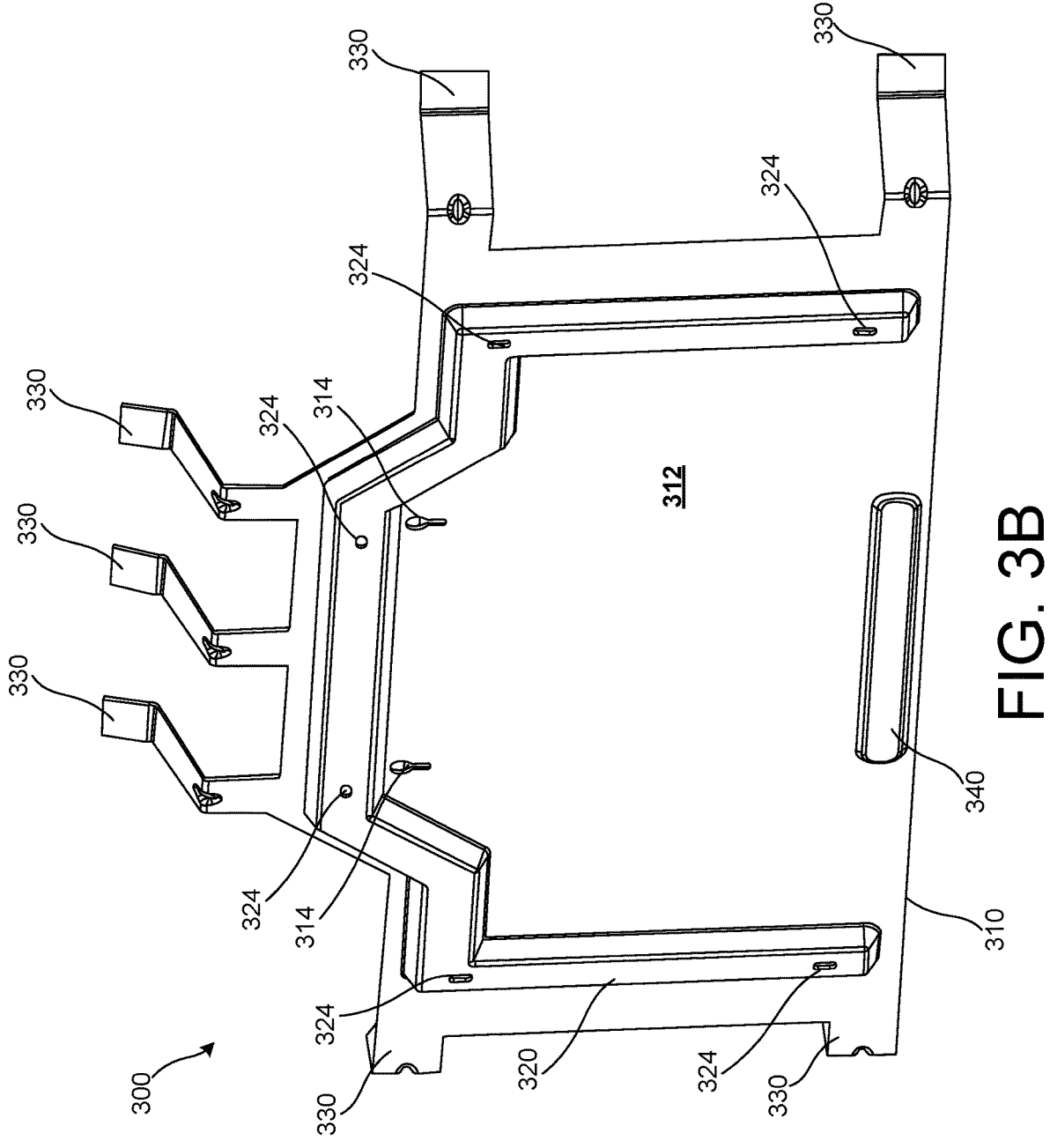
FIG. 3B is a second perspective view of the example frame assembly shown in FIG. 3A.
Figure 3C:
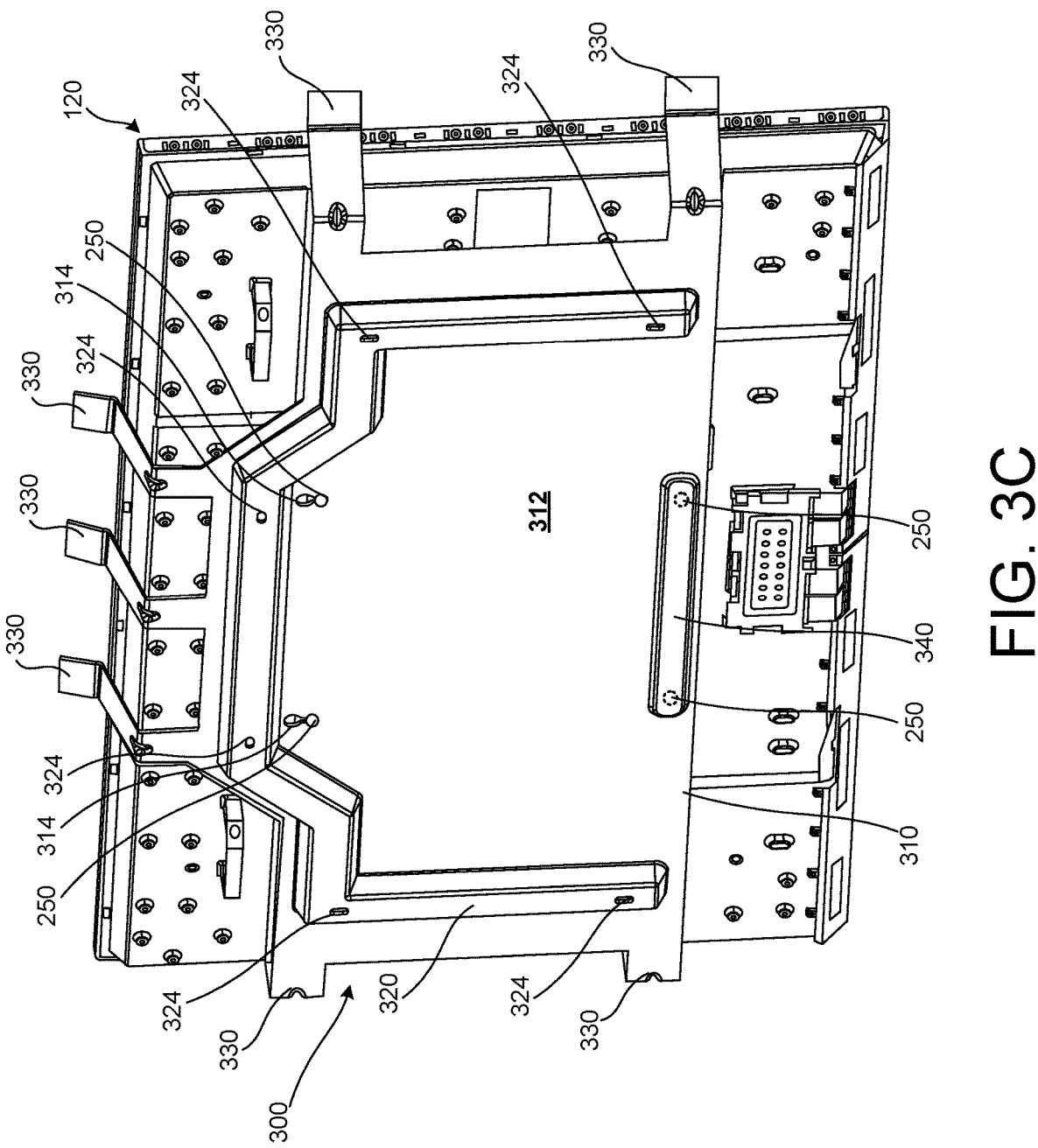
FIG. 3C is a perspective view, illustrating a positioning of the example frame assembly shown in FIGS. 3A and 3B relative to an example display device.

FIGS. 3A-3C illustrate an example frame assembly 300, in accordance with implementations described herein. In particular, FIG. 3A is a perspective view from a first side 311 of the example frame assembly 300 (oriented towards the display device 120 in the installed state). FIG. 3B is a perspective view from a second side 312 of the example frame assembly 300 (oriented toward a mounting structure such as the example stand 180 and/or the wall surface 190 in the installed state). FIG. 3C is a perspective view, illustrating a positioning of the example frame assembly 300 relative to an example display device, such as the example display device 120 described above. The example frame assembly 300 shown in FIGS. 3A-3C combines the functionality of the support frame 205 including the first support members 210, second support members 220 and third support members 230, the mounting plate 240, and the mounting bracket 260 described above, to provide for the mounting of a plurality of image sensors 130, or cameras, at a periphery of the example display device 120, while maintaining a relative position of the plurality of image sensors 130, or cameras, even in the event of deformation and/or warping of structural components of the display device 120. That is, the example frame assembly 300 may be mounted such that there is no load path between portions of the frame assembly 300 to which the plurality of image sensors 130, or cameras, are mounted, and structural components of the display device 120, such as, for example the backplate 121, such that deformation of the structural components of the display device 120 is not transferred or transmitted to portions of the frame assembly 300 to which the plurality of image sensors 130, or cameras, are mounted, and relative positioning of the plurality of image sensors 130, or cameras, is not affected by the deformation.

In the example shown in FIGS. 3A-3C, the frame assembly 300 includes a support plate 310. A plurality of support members 330, or mounting members, extend outward from the support plate 310. The plurality of support members 330, or mounting members, provide for the mounting of a plurality of image sensors 130, or cameras, and/or other such components (not shown in FIGS. 3A-3C) at the periphery of a display device to which the frame assembly 300 is coupled. In the example shown in FIGS. 3A-3C, a first mounting portion 320 and a second mounting portion 340 are formed in the support plate 310. The first mounting portion 320 and the second mounting portion 340 are formed as recessed portions relative to the first side 311 of the support plate 310, as shown in FIG. 3A. Thus, the first mounting portion 320 and the second mounting portion 340 protrude from the second side 312 of the support plate 310, as shown in FIGS. 3B and 3C.

In some examples, a plurality of openings 324 are formed in the first mounting portion 320. The plurality of openings 324 may serve as mounting points that provide for the attachment or coupling of the frame assembly 300 to an external support structure such as the stand 180, the wall surface 190, and the like described above. For example, fasteners may extend through the plurality of openings 324 formed in the first mounting portion 320, and into the external support structure, to couple the frame assembly 300 (having the plurality of image sensors 130, or cameras, and/or other such components, mounted on the plurality of support members 330; not shown in FIGS. 3A-3C) to the external support structure.

In some examples, a plurality of openings 314 are formed in the support plate 310. In some examples, the plurality of openings 314 in the support plate 310 have a keyhole shape, or a second portion having a smaller dimension than a first portion thereof. The plurality of openings 314 may serve as mounting points that provide for the mounting of the display device 120 onto the frame assembly 300, for example, after coupling of the frame assembly 300 to the external support structure as described above. In some examples, some of the mounting protrusions 250 on the backplate 121 of the display device 120 are slidably engaged in the plurality of openings 314 formed in the support plate 310. That is, some of the mounting protrusions 250 may be received in the (larger) first portion of the openings 314, and slide into and be engaged in the (smaller) second portion of the openings 314. In some examples, some of the mounting protrusions 250 are received in the recess defining the second mounting portion 340, as shown in FIG. 3C. With the frame assembly 300 coupled to the external support structure, the engagement of the mounting protrusions 250 in the plurality of openings 314, and in the second mounting portion 340, in this manner, the frame assembly 300 may provide for the mounting of the display device 120 to the desired external support structure.

In the example shown in FIGS. 3A-3C, recess defining the first mounting portion 320 separates the support plate 310 (to which the display device 120 is coupled) from the plurality of support members 330 (to which the plurality of image sensors 130, or cameras, are mounted). That is, the recess defining the first mounting portion 320, and a contour associated with the recess defining the first mounting portion, forms a rigid boundary between the support plate 310 and the plurality of support members 330. This physical separation provided by the rigid boundary defined by the first mounting portion isolates the plurality of support members 330 from the connection of the support plate 310 to the backplate 121 of the display device 120. Thus, this mounting arrangement inhibits the transfer of deformation forces from the display device 120 into the support members 330 to which the plurality of image sensors 130, or cameras, are mounted. In this example arrangement, even in the event of deformation, or warping, or deflection of the backplate 121 of the display device 120, the plurality of image sensors 130, or cameras, mounted at the plurality of support members 330 of the frame assembly 300 will maintain their relative positions, thus preserving the integrity of the image data obtained by the plurality of image sensors 130, or cameras.

Figure 4A:
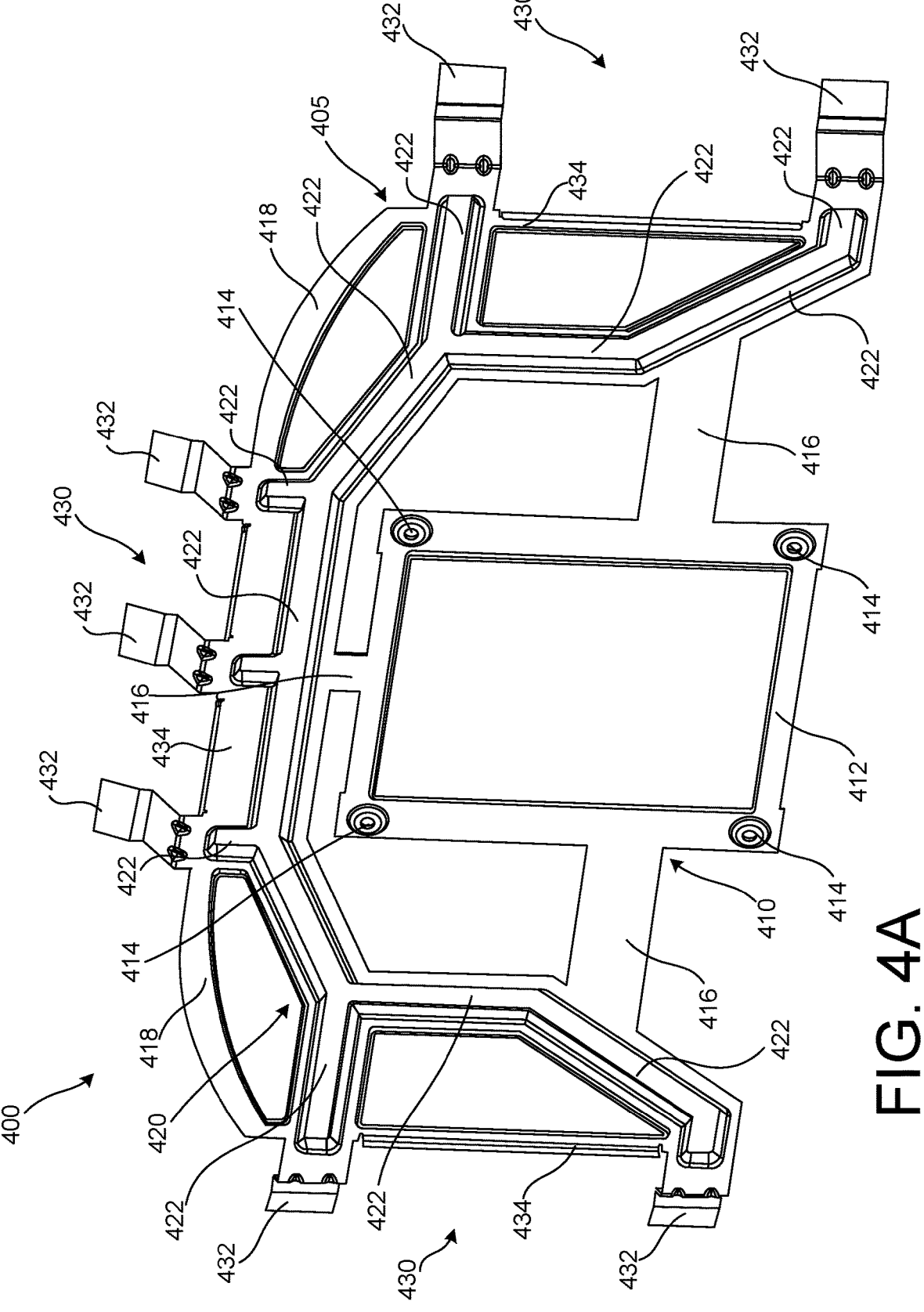
FIG. 4A is a perspective view of an example frame assembly configured for mounting of a plurality of cameras relative to a display device of a 3D video communication system.
Figure 4B:
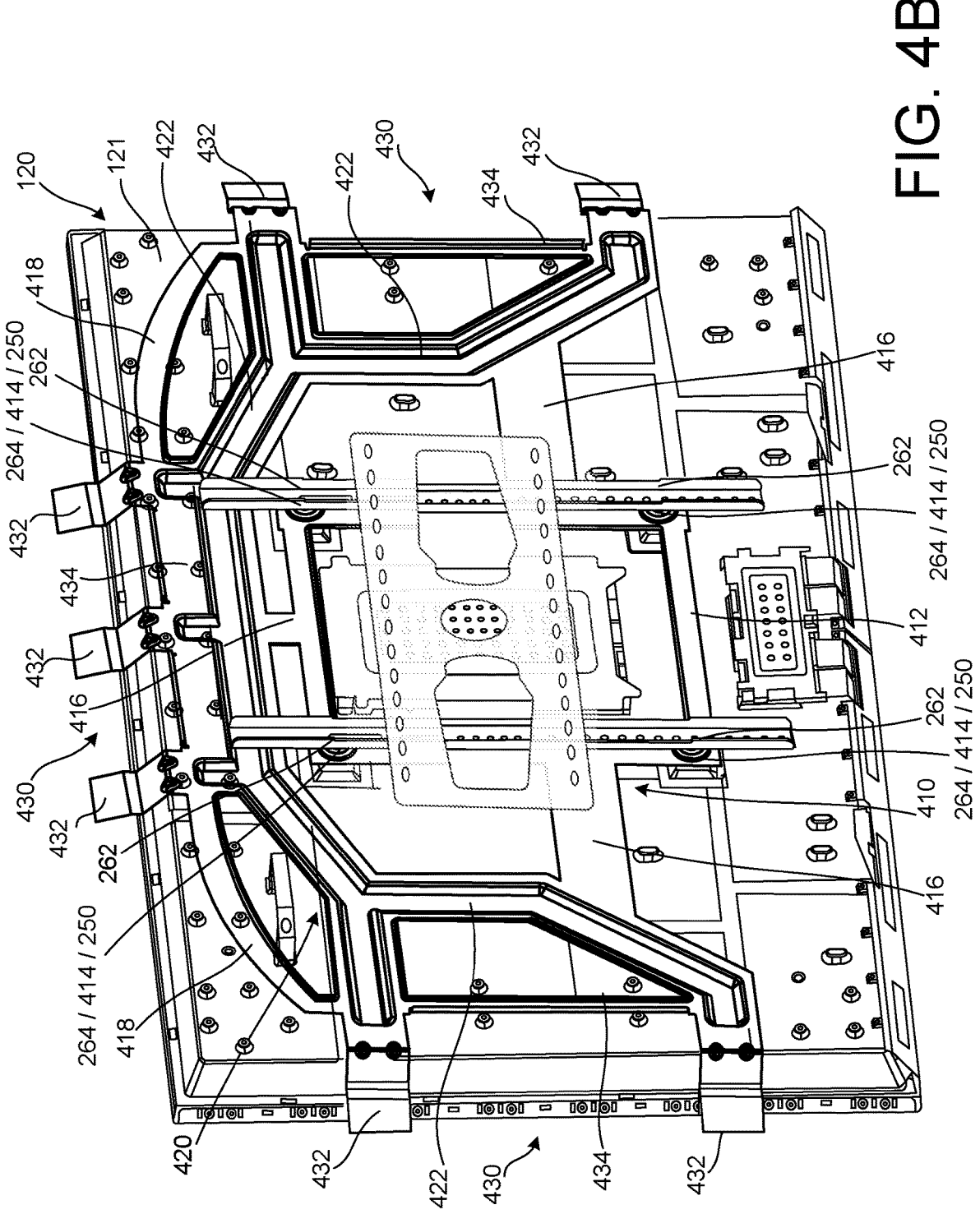
FIG. 4B is a perspective view, illustrating a positioning of the example frame assembly shown in FIG. 4A relative to an example display device.

FIGS. 4A and 4B illustrate an example frame assembly 400, in accordance with implementations described herein. In particular, FIG. 4A is a perspective view of an example support frame 405 of the example frame assembly 400. FIG. 4B is a perspective view, illustrating a positioning of the example frame assembly 400 relative to an example display device, such as the example display device 120 described above. The example frame assembly 400 provides for the mounting of a plurality of image sensors 130, or cameras, at a periphery of the example display device 120, while maintaining a relative position of the plurality of image sensors 130, or cameras, even in the event of deformation and/or warping of structural components of the display device 120. That is, the example frame assembly 400 may provide for the isolation of the mounting of the plurality of image sensors 130, or cameras, from the mounting of the display device such that there is no load path between portions of the frame assembly 400 to which the plurality of image sensors 130, or cameras, are mounted, and structural components of the display device 120, such as, for example the backplate 121. This may inhibit loads due to deformation of the structural components of the display device 120 due to operation of heat generating components from being transferred or transmitted to portions of the frame assembly 400 to which the plurality of image sensors 130, or cameras, are mounted, so that relative positioning of the plurality of image sensors 130, or cameras, is not affected by the deformation.

In the example shown in FIGS. 4A and 4B, the example frame assembly 400 includes a support frame 405 defined by a compliant frame portion 410 and a rigid frame portion 420. In some examples, the compliant frame portion 410 and the rigid frame portion 420 are formed and/or stamped from a single sheet of material, such as, for example, sheet metal material. In some examples, a contour, or surface geometry of the compliant frame portion 410 provides for some level of compliance or deformation in response to force(s) applied thereto. In some examples, a contour, or surface geometry of the rigid frame portion 420 provides for rigidity that allows the rigid frame portion 420 to maintain a desired configuration, even in response to forces applied to the frame assembly 400 that cause some level of compliance in the compliant frame portion 410.

In the example shown in FIGS. 4A and 4B, the compliant frame portion 410 includes a compliant support plate 412, with at least one compliant support arm 416 extending outward from the compliant support plate 412, between the compliant support plate 412 and the rigid frame portion 420. In the example shown in FIGS. 4A and 4B, the compliant frame portion 410 includes three compliant support arms 416, simply for purposes of discussion and illustration. The principles described herein can be applied to a support frame of a frame assembly including a compliant frame portion having more, or fewer compliant support arms, configured similarly to or differently from the example arrangement shown in FIGS. 4A and 4B.

In the example shown in FIGS. 4A and 4B, the rigid frame portion 420 is defined by a plurality of rigid sections that together define the rigid frame portion 420 of the example frame assembly 400. In some examples, a channel 422 or recess is defined in the rigid frame portion 420, following the contour of the rigid frame portion 420. The channel 422 or recess formed along the rigid frame portion 420 defines a contour or surface geometry that provides for stiffness, or rigidity of the rigid frame portion 420. In some examples, the channel 422 or recess formed in the rigid frame portion 420 has a somewhat squared, or U-shaped, cross-sectional shape or contour. In some examples, at least one support assembly 430 is coupled to the rigid frame portion 420. In the example shown in FIGS. 4A and 4B, three support assemblies 430 are coupled to the rigid frame portion 420, simply for purposes of discussion and illustration. In some examples, each support assembly 430 includes at least one support member 432, or mounting member, coupled to a rigid member 434. The support assemblies 430 may provide for the rigid mounting of the plurality of image sensors 130, or cameras, at peripheral portions of the display device 120. In some examples, compliant support arms 418 of the compliant frame portion 410 extend between adjacent support assemblies 430.

FIG. 4B illustrates an installed arrangement of the frame assembly 400 on the example display device 120. In some examples, the support frame 405 and the display device 120 are coupled with a mounting bracket, such as, for example, the mounting bracket 260 as described above. The mounting bracket 260 may provide for the mounting of the display device 120 to an external support structure such as, for example, the stand 180 shown in FIG. 1B, the wall surface 190 as shown in FIG. 1B, and the like.

As described above, the mounting bracket 260 may be coupled to the backplate 121 of the display device 120 by, for example, a plurality of fasteners 262. In some examples, the fasteners 262 extend through the opening 264 in the arm portion 266 of the mounting bracket 260, through a corresponding one of the openings 414 in the compliant support plate 412, and into a corresponding one of the mounting protrusions 250 on the backplate 121 of the display device 120. In the example arrangement shown in FIG. 4B, the backplate 121 includes four mounting protrusions 250, with four fasteners 262 each extending through a corresponding opening 264 in the arm portion 266 of the mounting bracket 260, through a corresponding opening 414 in the compliant support plate 412 of the compliant frame portion 410, and into an opening in the respective mounting protrusion 250, simply for purposes of discussion and illustration. The principles described herein can be applied to mounting arrangements including more, or fewer shared, or common mounting points, and/or combinations of mounting points.

In this example, the fasteners 262 extend through the mounting bracket 260, through the compliant support plate 412, and into the mounting protrusions 250 on the backplate 121 of the display device 120 to provide for coupling of the frame assembly 400 to the display device 120. In particular, this provides for coupling of the compliant frame portion 410 of the support frame 405 of the frame assembly 400 to the backplate 121 of the display device 120. This also provides for the mounting of the display device 120 to an external support structure such as the stand 180, the wall surface 190, and the like. In this arrangement, deformation or warping of the backplate 121 due to operation of the heat generating components is absorbed by the compliant frame portion 410 of the frame assembly 400. Forces due to deformation or warping of the backplate 121 are not transferred to the rigid frame portion 420 of the frame assembly 400, and thus not transferred to the support assemblies 430 and plurality of image sensors 130, or cameras (and/or other such components; not shown in FIGS. 4A and 4B) coupled thereto. Thus, in this arrangement, there is no transfer of load, generated at the backplate 121 of the display device 120, to the rigid frame portion 420 and/or the support assemblies 430 to which the plurality of image sensors 130, or cameras, are ultimately mounted. The shared, or common mounting points, which extend through the compliant support plate 412 of the compliant frame portion 410 of the support frame 405, provide for mounting of the display device 120 to the desired support structure. However, this mounting arrangement inhibits the transfer of deformation forces from the display device 120 into the rigid frame portion 420 and/or the support assemblies 430 to which the plurality of image sensors 130, or cameras, are mounted. Thus, in this example arrangement, even in the event of deformation, or warping, or deflection of the backplate 121 of the display device 120, the plurality of image sensors 130, or cameras, mounted at the support assemblies 430 of the frame assembly 400 will maintain their relative positions, thus preserving the integrity of the image data obtained by the plurality of image sensors 130, or cameras.

The terminology used herein is for the purpose of describing particular implementations only and is not intended to be limiting of the implementations. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below", or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example implementations of the concepts are described herein with reference to cross-sectional illustrations that are schematic illustrations of idealized implementations (and intermediate structures) of example implementations. As such, variations from the shapes of the illustrations as a result, for example, of manufacturing techniques and/or tolerances, are to be expected. Thus, example implementations of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example implementations.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the implementations described herein.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A stereoscopic display system, comprising:
a display device, including:
    a backplate including a plurality of light generating components;
    a plurality of optical layers; and
    an output layer;
a frame assembly coupled to the backplate; and
a plurality of image sensors mounted on the frame assembly, arranged along outer peripheral portions of an outer boundary of the display device,
wherein the frame assembly includes:
    a support frame including at least one mounting member to which the plurality of image sensors are mounted;
    a mounting portion coupled to the backplate, with the support frame positioned between the mounting portion and the backplate, the mounting portion configured to provide for mounting of the display device to an external support structure; and
    a plurality of fasteners mounting the support frame and the mounting portion of the frame assembly on the backplate at a plurality of common mounting points so as to maintain a relative position of the plurality of image sensors in response to deformation of the backplate.

2. The stereoscopic display system of claim 1, wherein the support frame includes:
at least one first support member extending from a first lateral side portion of the display device to a second lateral side portion of the display device; and
at least one second support member extending from a central portion of the at least one first support member to an upper side portion of the display device,
wherein the at least one mounting member is provided at at least one of:
    an end portion of the at least one first support member corresponding to the first lateral side portion or the second lateral side portion of the display device, or
    an end portion of the at least one second support member corresponding to the upper side portion of the display device, and
wherein the plurality of image sensors are arranged on the at least one mounting member.

3. The stereoscopic display system of claim 2, wherein the mounting portion includes:
a mounting plate positioned on the support frame, with the support frame positioned between the mounting plate and the backplate; and
a mounting bracket positioned on the mounting plate and configured to provide for mounting of the display device to the external support structure,
wherein the plurality of fasteners extend through the mounting bracket, through the mounting plate, and into the plurality of common mounting points, such that the mounting portion is directly coupled to the backplate of the display device, and
the plurality of fasteners do not extend through the support frame, such that a load generated due to deformation of a backplate of the display device is not transmitted to the support frame.

4. The stereoscopic display system of claim 1, wherein the support frame includes:
a compliant frame portion coupled to the backplate of the display device; and
a rigid frame portion coupled to the compliant frame portion, wherein the rigid frame portion includes the at least one mounting member on which the plurality of image sensors are arranged.

5. The stereoscopic display system of claim 4, wherein the compliant frame portion of the support frame includes:
a compliant support plate at a central portion of the support frame;

a plurality of openings formed in the compliant support plate, at positions corresponding to the plurality of common mounting points; and a plurality of compliant support arms extending between the compliant support plate and the rigid frame portion of the support frame.

6. The stereoscopic display system of claim 5, wherein the rigid frame portion of the support frame includes:

a rigid member positioned around the compliant support plate, and connected to the compliant support plate by the plurality of compliant support arms;

a channel formed in the rigid member defining a cross-sectional contour of the rigid member; and a plurality of support assemblies formed at an outer peripheral portion of the rigid member, including the at least one mounting member to which the plurality of image sensors is mounted.

7. The stereoscopic display system of claim 5, wherein the mounting portion includes:

a mounting bracket positioned on the compliant frame portion of the support frame and configured to provide for mounting of the display device to the external support structure, wherein the plurality of fasteners extend through the mounting bracket, through the plurality of openings in the compliant frame portion, and into the plurality of common mounting points.

8. The stereoscopic display system of claim 7, wherein a rigidity of the rigid frame portion is greater than a rigidity of the compliant frame portion of the support frame, such that a load generated in response to deformation of the backplate of the display device is absorbed by the compliant frame portion and is not transmitted to the rigid frame portion.

9. A frame assembly for a stereoscopic display device, the frame assembly comprising:

a support frame including a plurality of support members, the support frame including:

at least one first support member extending from a first end portion to a second end portion of the frame assembly;

at least one second support member extending from the at least one first support member to a third end portion of the frame assembly; and at least one third support member, provided at at least one of:

an end portion of the at least one first support member corresponding to one of the first end portion or the second end portion of the frame assembly, or an end portion of the at least one second support member corresponding to the third end portion of the frame assembly;

a mounting plate positioned on the support frame, with the support frame positioned between the mounting plate and the display device;

a mounting bracket positioned on the mounting plate and configured to provide for mounting of the display device to an external support structure; and a plurality of fasteners extending through the mounting bracket, through the mounting plate, and into a corresponding plurality of mounting points formed in the display device, wherein the support frame is configured to maintain a relative position of a plurality of image sensors mounted on the at least one third support member at a corresponding peripheral portion of the display device;

wherein the support frame is configured to maintain the relative position of the plurality of image sensors mounted on the at least one third support member in response to a deformation of a backplate of the display device to which the frame assembly is coupled.

10. The frame assembly of claim 9, wherein the at least one first support member includes a plurality of first support members extending from a first lateral side portion of the display device, corresponding to first end portions of the plurality of first support members, to a second lateral side portion of the display device, corresponding to second end portions of the plurality of first support members;

the at least one second support member includes a plurality of second support members extending from a central portion of the plurality of first support members to an upper side portion of the display device; and the at least one third support member includes:

a first mounting member at the first end portions of the plurality of first support members, extending along the first lateral side portion of the display device;

a second mounting member at the second end portions of the plurality of first support members, extending along the second lateral side portion of the display device; and a third mounting member at end portions of the plurality of second support members, extending along the upper side portion of the display device.

11. The frame assembly of claim 10, wherein the support frame is configured to maintain a relative position of a plurality of images sensors mounted on the first mounting member, the second mounting member, and the third mounting member.

12. The frame assembly of claim 9, wherein the plurality of fasteners do not extend through the support frame, such that a load generated due to deformation of a backplate of the display device is not transmitted to the support frame.

13. The frame assembly of claim 9, further comprising a plurality of mounting protrusions formed on a backplate of the display device, the plurality of mounting protrusions defining the plurality of mounting points formed in the display device.

14. The frame assembly of claim 13, wherein the plurality of mounting protrusions each include an opening configured to respectively engage the plurality of fasteners, and wherein a thickness of the plurality of mounting protrusions provides for spacing between the backplate and the mounting plate in which the at least one first support member and the at least one second support member are received.

15. A stereoscopic display system, comprising:

a display device, including:

a backplate including a plurality of light generating components;

a plurality of optical layers; and an output layer;

a frame assembly coupled to the backplate, the frame assembly including:

a support plate;

a first channel formed in a peripheral portion of the support plate, the first channel defining a first mounting portion;

a plurality of openings formed in the first channel and configured to receive a plurality of fasteners therethrough for mounting of the frame assembly to an external support structure; and a plurality of support members formed at the peripheral portion of the support plate, extending outward from the first channel; and a plurality of image sensors arranged on at least one of the plurality of support members, along a peripheral portion of the display device, so as to maintain a relative position of the plurality of image sensors in response to deformation of the backplate.

16. The stereoscopic display system of claim 15, further comprising:

a plurality of mounting protrusions extending outward, from the backplate of the display device; and a second mounting portion formed in the support plate, the second mounting portion including:

a plurality of openings formed in the support plate; and a second channel formed in a peripheral portion of the support plate.

17. The stereoscopic display system of claim 16, wherein the plurality of openings formed in the support plate are configured to slidably engage corresponding mounting protrusions of the plurality of mounting protrusions formed on the backplate; and the second channel is configured to receive corresponding mounting protrusions of the plurality of mounting protrusions formed on the backplate, to couple the display device to the frame assembly.

18. The stereoscopic display system of claim 17, wherein the plurality of openings formed in the support plate each include:

a first opening portion; and a second opening portion having a dimension that is less than a corresponding dimension of the first opening portion such that a corresponding mounting protrusion is received in the first opening portion and slidably engaged in the second opening portion.

19. The stereoscopic display system of claim 15, wherein a contour of the first channel inhibits a load, generated in response to deformation of the backplate of the display device, from being transmitted to the plurality of support members on which the plurality of image sensors are arranged.

* * * * *